ized May 30, 1967

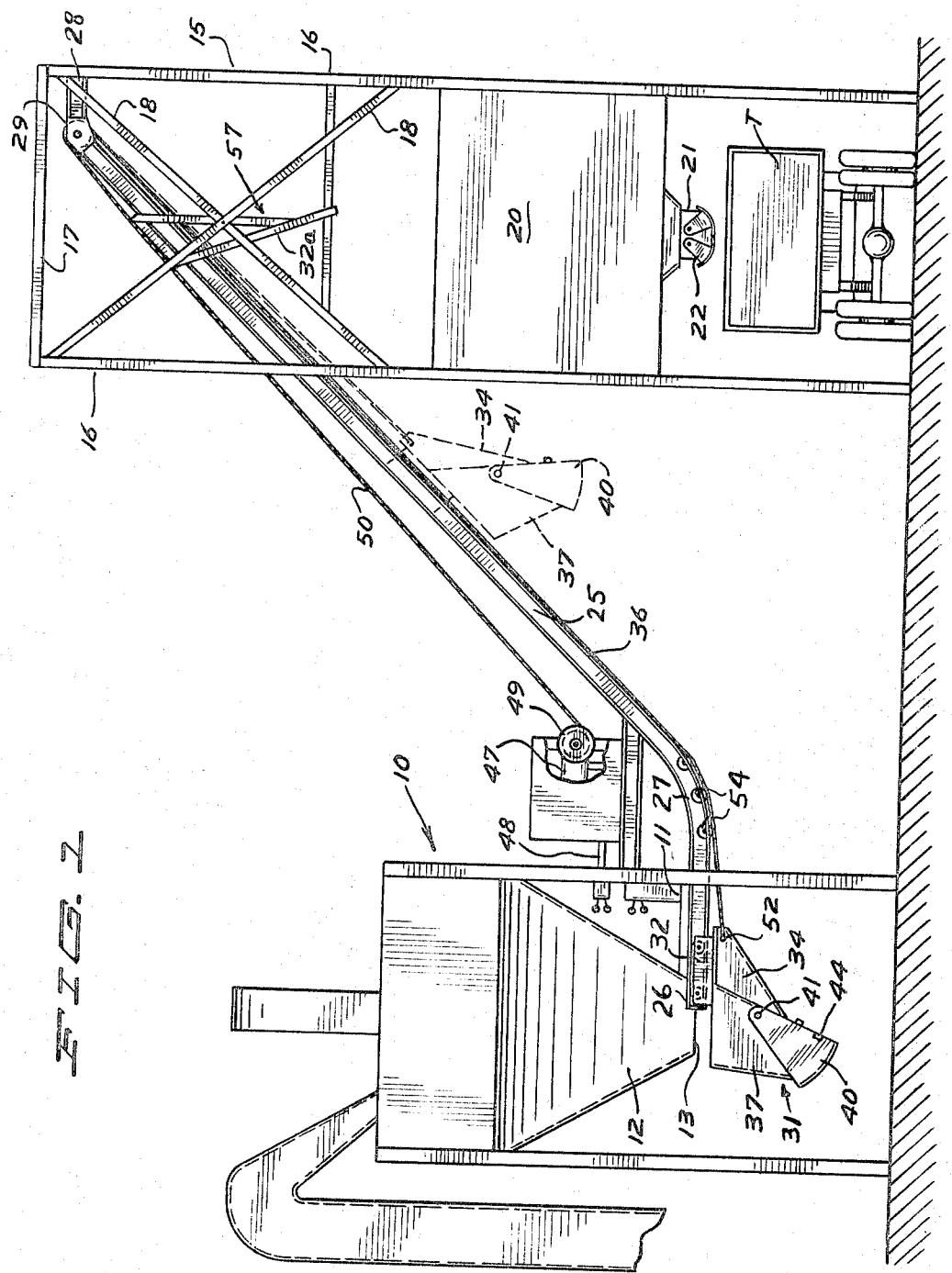

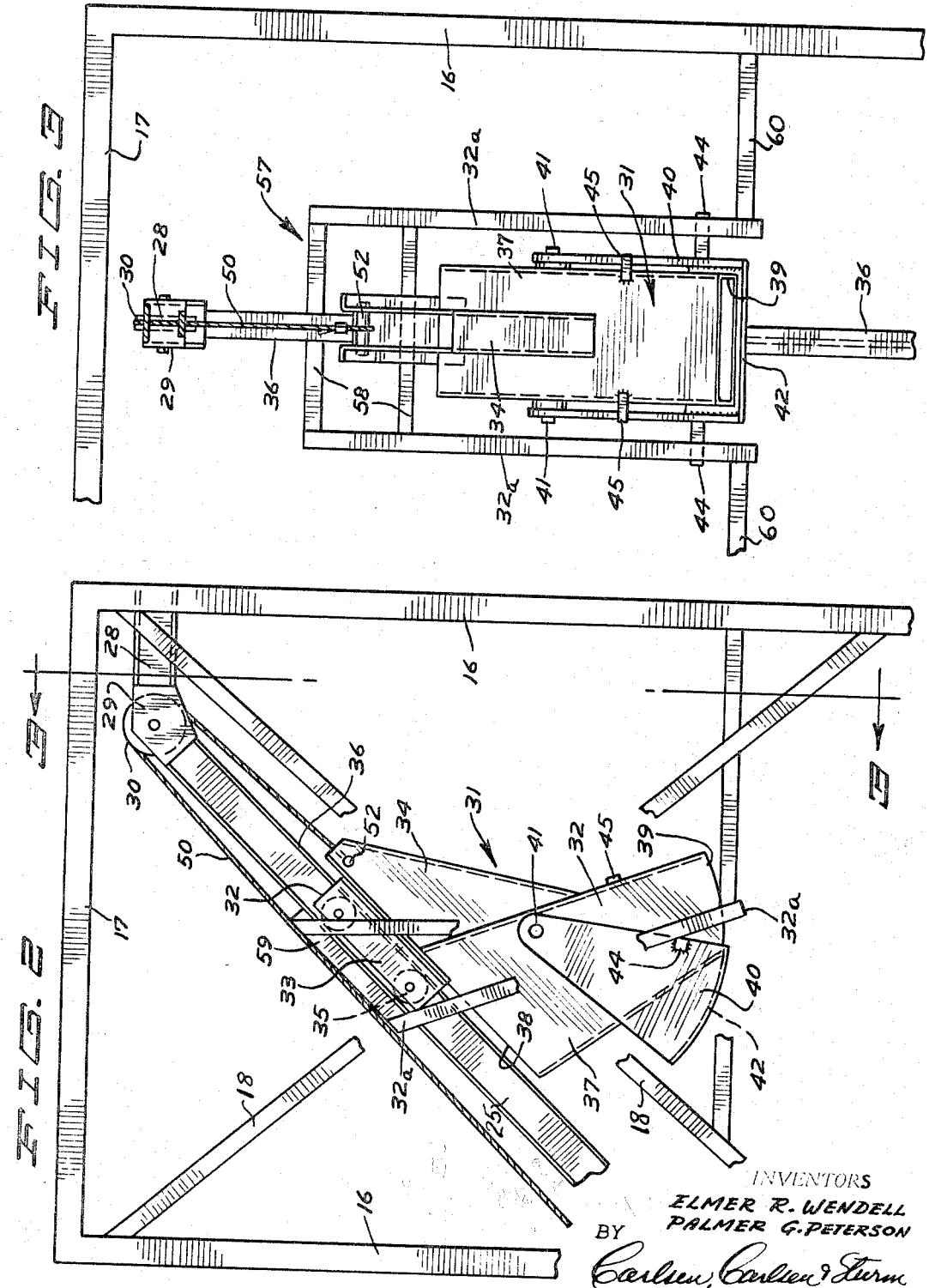

United States Patent Office 3,322,289

3,322,289
LOADING, STORAGE AND DISPENSING APPARATUS FOR USE WITH A BITUMINOUS MIXING PLANT
Elmer R. Wendell, 7515 Auto Club Road, Bloomington, Minn. 55431, and Palmer G. Peterson, 2406 Hayes Court, Burnsville, Minn. 55378
Filed June 30, 1965, Ser. No. 468,264
6 Claims. (Cl. 214—41)

This invention relates generally to the dispensation of hot ready mixed bituminous materials from the mixing plant to the transporting vehicles and is particularly concerned with apparatus providing an auxiliary storage system for the plant so as to increase the truck loading capacity of the plant during periods of high demand.

In the manufacture of hot ready mixed bituminous materials, the materials are generally dumped directly from the mixing plant or pugmill into a truck carrier for transportation to their place of intended use. When the plant is operating its production is relatively constant at a predetermined tonnage per hour. The demand for such materials, however, is seldom constant but rather encounters slack periods interspersed with periods of great demand. Thus when there is no demand the plant is shut down. On the other hand, when there is a high demand the transport trucks and their drivers are kept wainting in line for the plant to produce their anticipated load.

The purpose of the present invention is to provide a system which allows the mixing plant to continue operation during slack periods while yet increasing its dispensing capacity during surge periods or periods when the demand is greater than the production capacity of the plant.

The primary object of the present invention is to provide a storage and dispensing apparatus for a bituminous mixing plant which is adapted to receive, store and discharge bituminous mix in a heated condition to facilitate continuous operation of the plant despite a lapse in demand therefrom and to increase the supply capabilities of the plant during surge periods where the demand exceeds the normal plant production.

Another object of the invention is to provide a storage and dispensing apparatus for a bituminous mixing plant which is adapted to convey material from the plant for storage in a surge hopper and which is controlled completely by the plant operator.

With these and other objects in view the invention broadly comprises a storage and dispensing apparatus for a bituminous mixing plant having a downwardly opening discharge chute, a surge or storage hopper positioned in laterally spaced relation beside the plant, a rigid track extending from the chute upwardly and outwardly over the hopper, a mix carrier mounted on the track for movement therealong, power means for moving the carrier along the track, said power means being operable from an operator's station on the mixing plant whereby the carrier may be operated by the plant operator to carry loads of mix from the chute to above the hopper, and there being means for automatically dumping the carrier to discharge the contents thereof into the hopper.

The above mentioned and additional objects of the invention will be brought to light during the course of the following specification, reference being made to the accompanying drawings, in which:

FIG. 1 is a side elevation of a bituminous mixing plant with the storage and dispensing apparatus forming the subject of this invention connected thereto and showing the material bucket or carrier in loading position under the plant discharge chute and showing the same carrier in broken lines at an intermediate position between loading and unloading positions.

FIG. 2 is a side view of the carrier in its elevated unloading position with certain portions of the hopper superstructure and carrier door trip frame broken away for a clear showing of the carrier in dumping condition.

FIG. 3 is a front view of the carrier and trip frame taken on line 3—3 of FIG. 2.

Referring now more particularly to the drawings, reference numerals will be used to denote like parts or structural feature in the different views. The numeral 10 denotes generally a plant for preparing, mixing and heating a bituminous composition material such as hot asphalt of the type commonly used for roadway surfacing. The plant includes an operator's platform 11 from which an operator controls the various units of plant apparatus used in the conveying, grinding, drying, mixing, heating, etc., of component materials. The numeral 12 denotes a discharge chute having an open bottom at 13 from which the end product is discharged, normally into the body of a transport truck parked thereunder. Suitable mechanism (not shown), controllable from the station 11, is provided for selectively opening or closing the chute opening 13.

Referring now to the right-hand side of FIG. 1 the number 15 denotes an upright framework or tower having four upright legs 16 disposed at the corners of a rectangle and interconnected by suitable horizontal braces 17 and diagonal braces 18. It may be assumed that the front to rear dimension of the tower (not shown) is substantially the same as the width thereof as shown in FIG. 1. An open top storage hopper 20 is mounted at a vertically medial position on the tower. This hopper is heated in any suitable well known manner such as by having liquid pipes extending through the walls thereof for conducting heated liquid therethrough. The bottom wall of the hopper carries an open bottom discharge trough 21, the opening of which is covered by a pair of pivoted clamshell gates 22. Trough 21 is spaced sufficiently over the ground to allow a truck body T to be parked thereunder as shown in FIG. 1. Suitable means are provided for power opening of the gates 22 to dump material from the hopper into the truck.

A heavy I-beam track 25 has one end connected as at 26 to the lower end of chute 12 adjacent to the opening 13. From its connection at 26 the track extends horizontally toward the tower 15, then angles upwardly as at 27 to extend upwardly over the hopper 20 where it is connected to the upper portion of the tower as by the stub beam 28 and gusset plates 29. A pulley 30 is journaled between the plates 29.

The material carrier or bucket is denoted generally at 31 and will next be described. A bucket carriage 32 is formed of a pair of plates 33 disposed one on either side of the track 25 and integrally connected to triangular support bracket 34. Each plate 33 has a pair of rollers 35 journaled thereon to roll along the bottom flange 36 of the track. A downwardly tapering box-shaped receptacle 37 is integrally mounted on the bracket 34 to be carried therewith as the carriage 32 moves along the track. The receptacle 37 is positioned against the inner edge of the bracket and is centered on the track so as to extend under the opening 13 when the carrier is in the position shown in full lines in FIG. 1.

Both the top 38 and the bottom 39 (FIG. 2) of the receptacle 37 are open so that material from the chute 12 of the plant 10 may be dumped through opening 13 directly into the receptacle. A closure gate 40 is provided on the carrier to close the open bottom 39 of the receptacle. The gate has a general U-shape, with the legs thereof coaxially pivoted as at 41 to the side walls of the bucket, and the lower edges of which are rounded, as shown in FIG. 2, on an arc of the pivot axis. The end wall 42 of the gate 40 is also curved on this axis to close tightly under the opening 39. Each side wall of the gate carries a laterally extending catch bar 44. The outer or front side of the bucket is provided with a pair of laterally extending stops 45, best shown in FIG. 3.

The gate 40 is mounted on the bucket so that its center of gravity is slightly outward or forward from the vertical plane of the pivot axis at all operating positions of the bucket so that the gate will gravitationally rest against stops 45 with the wall 42 closing the bottom opening 39.

A power operated winch 47 having a control device 48 enabling operation thereof from the operator's platform 11 is mounted at the side of the plant facing the hopper 20 and over the track 25. The winch drum 49 has a cable 50 wound thereon which extends from the drum upwardly and around pulley 30, then downwardly under the track for connection of its distal end with the plate 34 as at 52. A series of idler guide pulleys 54 are provided in the transverse center of the track portion 27 to project below the track flange 36 to receive and center the cable in that area. These pulleys are centered between the paths of rollers 35 so as not to interfere with movement of the rollers along flange 36.

A carrier trip frame designated generally at 57 is mounted near the upper end portion of the track 25 directly over the hopper 20. This frame includes parallel bars 58 mounted crosswise on the beam and spaced apart therealong, longitudinal bars 59 connecting the ends of the cross bars at each side, and downwardly converging and meeting bars 32ᵃ at each side. The lower connected ends of bars 32ᵃ are supported by suitable braces 60.

Operation of the apparatus will now be understood. During slack periods when the demand for bituminous mix is low, such as during the hours of darkness, the plant 10 may be kept in continuous operation. The mix from the plant is dumped in a measured quantity from chute 12 into the carrier 31 as it rests in the area under the chute as shown in FIG. 1. The operator positioned on platform 11 then operates the control device 48 causing the winch 49 to wind the cable 50 in. This pulls the loaded carrier 31 up the track 25 to a position over the hopper 20, as shown in FIGS. 2 and 3. During the ascent the gate 40 remains gravitationally closed. As the carrier moves into the upper station or position the catch bars 44 will engage bars 32ᵃ of the trip frame 57 and be held thereby causing the gate to swing open to the position shown in FIG. 2 and the carrier load will be dumped into the hopper 20. The operator then releases the winch to slowly wind out cable 50 allowing the carrier to gravitationally descend to its loading position under chute 12. Closure gate 40 will automatically close during descent. Suitable frictional braking means may be provided between the carriage 32 and track 25 to limit the speed of descent of the carrier. The operation is repeated until the hopper 20 has been filled. When the hopper 20 has been filled or the apparatus is not in use, the carrier 31 may be stored and locked in the position shown in broken lines in FIG. 1 or in its unloading position over the hopper.

During surge periods when the demand for the bituminous mix is great, trucks T may be simultaneously loaded from the chute 12 and the hopper 20, thus doubling the loading capacity of the plant during these periods. Gates 22 are provided with suitable control means for opening and closing thereof from a remote point such as from the operator's station 11 or, preferably, a separate station adjacent the surge hopper 20.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a storage and dispensing apparatus for a bituminous mixing plant having a downwardly opening discharge chute spaced above the ground for movement of a transport vehicle into a first loading station thereunder, a storage hopper supported over the ground in spaced relation to the plant and having a second loading station thereunder, an elongated track having one end disposed adjacent the open end of the chute and then extending outwardly and upwardly over the storage hopper in spaced relation thereabove, a mix carrier bucket mounted on the track for movement therealong between a first position under the chute to receive mix therefrom and a second position over the hopper, power means connected to the bucket for moving the bucket from said first to said second position, and means for dumping the bucket in said second position to discharge the contents thereof into the hopper.

2. The subject matter of claim 1 wherein said track extends along a continuously rising substantially diagonal path in its outward extension for gravitational return of the bucket therealong from the second to the first position.

3. The subject matter of claim 1 wherein said mixing plant has an operator's station mounted on one side thereof, said hopper being located at the same side of the plant as said operator's station, and said power means having control means positioned adjacent to and being operable from said operator's station.

4. The subject matter of claim 1 wherein said bucket is provided with a swingable bottom closure member which is mounted on the bucket to gravitationally remain in closed position, and catch means supported on the track adjacent the outer end thereof in the path of movement of said closure member to engage and move said member to an open position to dump the bucket as the bucket is moved into said second position.

5. The subject matter of claim 4 wherein said closure member has ears projecting outwardly on either side of the bucket transversly of the path of movement, and said catch means comprising a framework mounted on the track and having bars extending downwardly on either side thereof for engagement with said ears to hold the closure member as the bucket moves into said second position.

6. The subject matter of claim 1 wherein said power means comprises a motorized winch disposed between the chute and hopper, a pulley mounted on the extended end of the track, and a cable having one end wound on the winch and extending over the pulley and having its extended end connected to the bucket.

References Cited

UNITED STATES PATENTS 815,823   3/1906   Hetzel et al. _____ 294—69
3,112,099  11/1963  Heise _____ 259—149 X GERALD M. FORLENZA, *Primary Examiner.*

R. G. SHERIDAN, *Assistant Examiner.*